June 4, 1963    L. C. CHAMBERS    3,092,200
WHEELED CONVEYOR
Filed Jan. 19, 1961    3 Sheets-Sheet 1
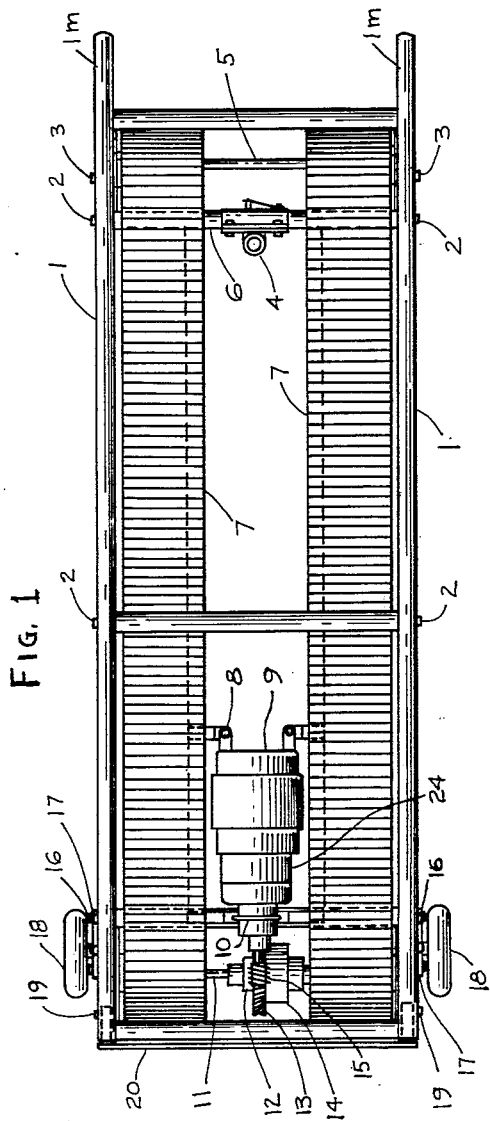
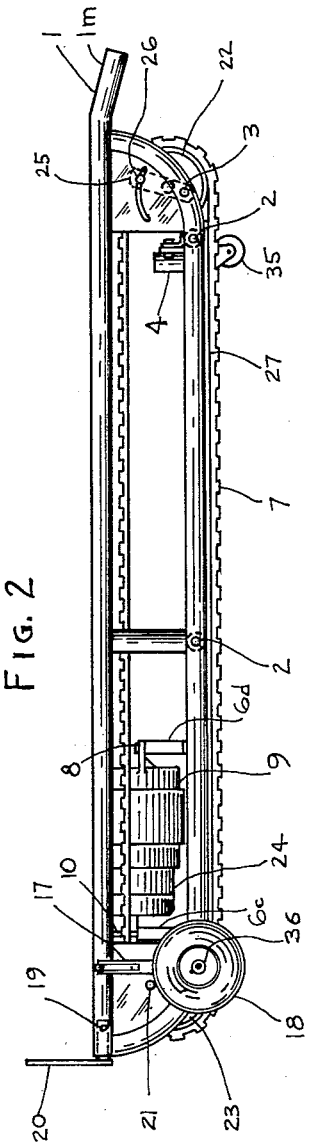
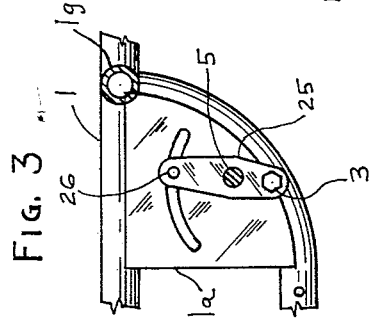
INVENTOR.
LYAL C. CHAMBERS
BY
Isler & Ornstein
ATTORNEYS

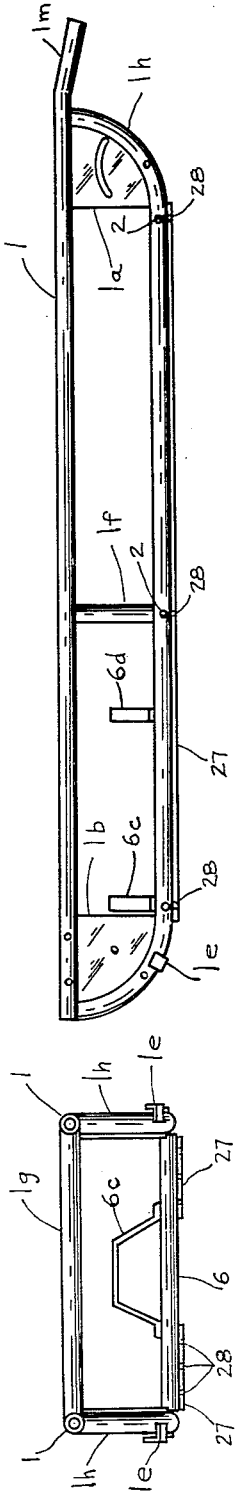
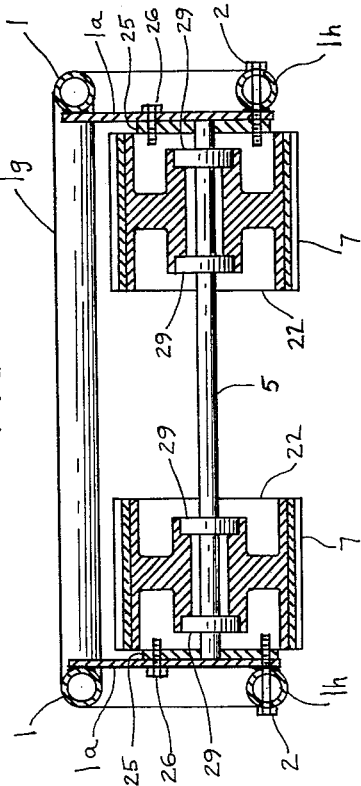
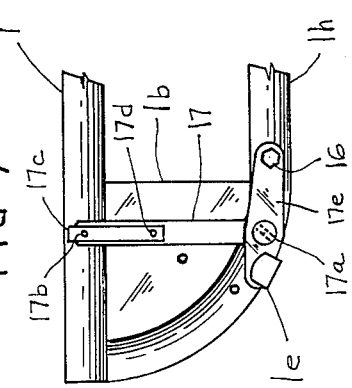

June 4, 1963  L. C. CHAMBERS  3,092,200
WHEELED CONVEYOR
Filed Jan. 19, 1961  3 Sheets-Sheet 3
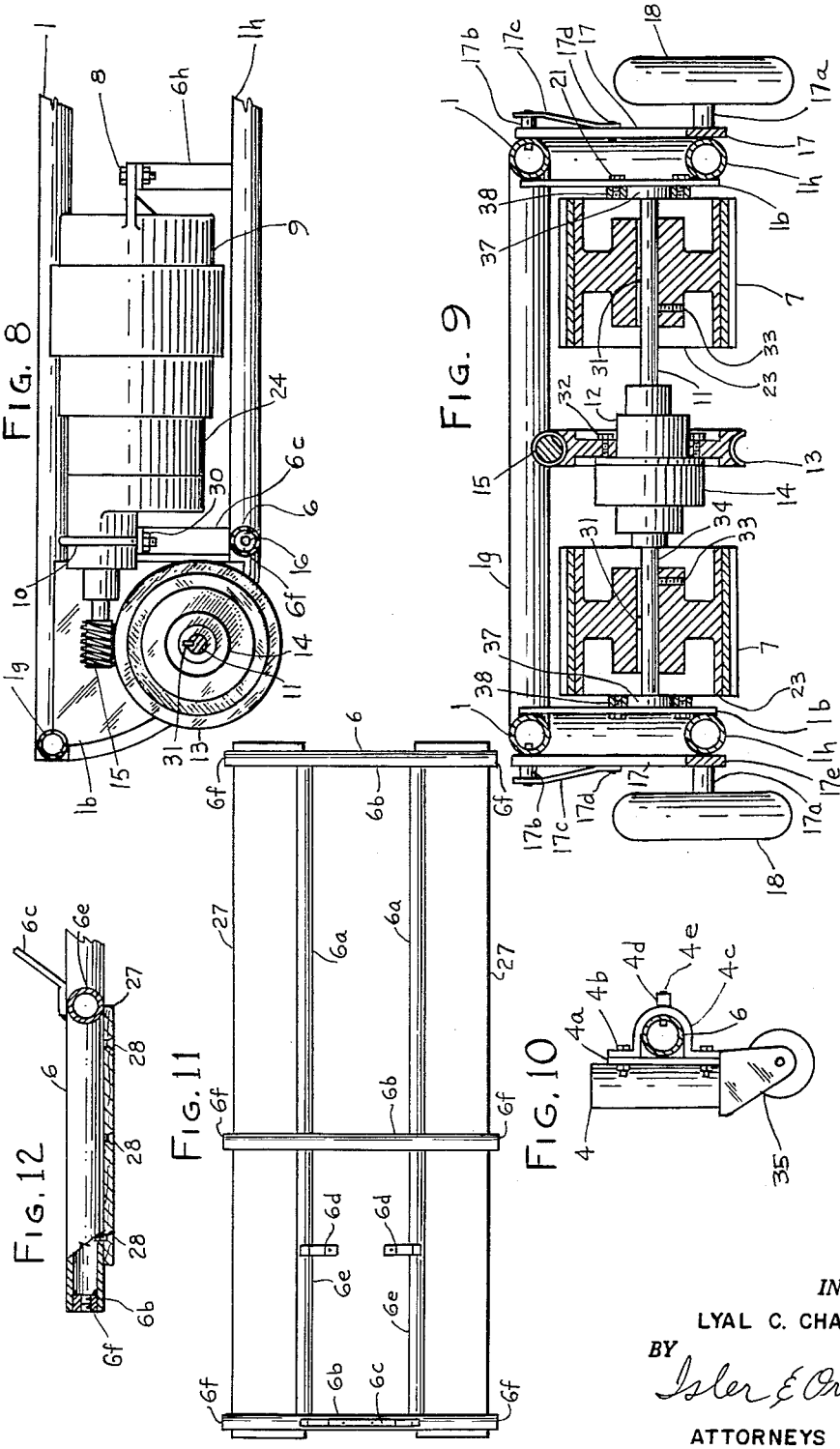
INVENTOR.
LYAL C. CHAMBERS
BY
Isler & Ornstein
ATTORNEYS

United States Patent Office 3,092,200
Patented June 4, 1963

3,092,200
WHEELED CONVEYOR
Lyal C. Chambers, 563 S. Diamond St., Mansfield, Ohio
Filed Jan. 19, 1961, Ser. No. 83,663
2 Claims. (Cl. 180—9.22)

This invention relates generally to a wheeled conveyor, but has reference more particularly to a type of conveyor which is used for transporting or hauling large appliances, such as a refrigerator, up or down a flight of stairs, or on level ground.

A primary object of the invention is to provide a device of the character described, which can be used as a power-driven crawler type conveyor or tractor, as a wheeled manually-manipulable truck, or as a dolly.

Another object of the invention is to provide a device of the character described, in which power-driven crawler type belts are provided, and in which these belts and the parts associated therewith, along with the power-drive mechanism, can be removed from the device, when the device is to be used as a wheeled truck or dolly, thereby greatly lessening the weight of the device for these latter purposes, and facilitating manual manipulation thereof.

Another object of the invention is to provide a device of the character described, in which novel means are incorporated for adjusting the tension of the crawler-type belts.

A further object of the invention is to provide a device of the character described, in which a novel mounting is provided for the front wheels of the device.

Other objects and advantages of my invention will be apparent during the course of the following description.

In the accompanying drawings forming a part of this specification, and in which like numerals are employed to designate like parts throughout the same, FIG. 1 is a top plan view of the device, showing the front wheels and caster wheel in the position they occupy when the device is to be used as a dolly, or as a wheeled truck;

FIG. 2 is a side elevational view of the device;

FIG. 3 is a fragmentary cross-sectional view, showing the means for adjusting the tension of the belts;

FIG. 4 is a side elevational view of the upper frame assembly;

FIG. 5 is an end elevational view of the upper frame assembly, as viewed from the left end of FIG. 4;

FIG. 6 is a cross-sectional view through the rear portion of the device;

FIG. 7 is a fragmentary side elevational view, showing the wheel mounting bracket;

FIG. 8 is a fragmentary cross-sectional view, showing the power drive for the belts;

FIG. 9 is a cross-sectional view, through the front portion of the device;

FIG. 10 is a fragmentary cross-sectional view, showing the caster wheel mounting;

FIG. 11 is a top plan view of the lower frame assembly, and

FIG. 12 is a fragmentary view, partly in elevation and partly in section, showing certain details of the lower frame assembly.

Referring more particularly to the drawings, the conveyor will be seen to comprise an upper frame assembly comprising a pair of transversely spaced tubular members 1, a pair of similarly spaced tubular members 1h having curved end portions which are welded at their upper ends to the lower surface of the members 1, tubular members 1g, which extend transversely between the members 1 and have their ends welded to the inboard surfaces of the members 1, and tubular struts 1f which extend between the members 1 and 1h and have their ends welded to the members 1 and 1h.

The members 1 are provided with down turned handle portions 1m at one end, which serve a purpose to be presently described.

Welded to the inboard faces of the members 1 and 1h, at one end of the aforesaid frame assembly are plates 1a, which are substantially in the form of quadrants of a circle, so that the curved marginal portions of these plates conform in curvature to the curvature of the adjacent curved ends of the members 1h.

Welded to the inboard faces of the members 1 and 1h, at the opposite end of the aforesaid frame assembly are plates 1b, which are also in the form of quadrants of a circle, so that the curved marginal portions of these plates conform in curvature to the curvature of the adjacent curved ends of the members 1h.

It may be noted, at this point, that the plates 1a and 1b are parts of the aforesaid frame assembly, and that this frame assembly further includes wheel bracket straps 1e, which, as shown in FIGS. 4, 5 and 6, are welded to the lower surfaces of the curved ends of the members 1h, and which serve a purpose to be presently described.

The conveyor also includes a lower frame assembly 6, which is, at times, removable from the upper frame assembly, and which comprises a plurality of tubular members which are welded together in a manner such that all of the members are substantially coplanar. These, as best shown in FIG. 11, include three longitudinally-spaced members 6b, and transversely spaced members 6a and 6e. The members 6b are provided in their ends with threaded bushings 6f (see FIG. 12), so that when the lower frame assembly is positioned as shown in FIGS. 1, 2, 4 and 5, the assembly may be secured to the upper frame assembly, as by means of bolts 2, which are threaded into the bushings 6f.

The lower frame assembly further includes a transmission mounting bracket 6c, which, as shown in FIGS. 1, 2, 4, 5, 8, 11 and 12, is welded to the upper surface of one of the end members 6b, and motor mounting brackets 6d, which, as shown in FIGS. 2, 4, 8 and 11, are welded to the upper surfaces of the members 6a.

Secured to the lower surfaces of the members 6b, as by means of screws 28, are boards 27, which serve a purpose to be presently described.

Secured to the plates 1b, as by means of bolts 21 are bearing mounting blocks 38, in which are mounted bearings 37 for drive axles or shafts 11 and 34, which are driven, as by means of a motor 9, mounted on the brackets 6d by means of bolts 8. The drive from the motor 9 is through the intermediary of a transmission 24, a worm 15, a pinion 13, a differential plate 12 and a differential 14, the pinion 13 being secured to the differential plate 12 by means of bolts 32. The transmission is clamped to the bracket 6c by means of a clamp 10 and nuts 30.

The shaft 34 has keyed thereto, as by a key 31, a pulley 23, a set screw 33 being also provided for securing the pulley to the shaft.

The shaft 11 has keyed thereto, as by a key 31, a pulley 23, a set screw 33 being also provided for securing the pulley to the shaft.

Pivotally secured to the inboard faces of the plates 1a, as by means of pivot bolts 3, which extend through the members 1h and the plates 1a, are brackets 25, in which is supported the ends of an idler axle or shaft 5, this shaft being provided with bearings 29, on which idler pulleys 22 are mounted for rotation.

Endless belts 7 are provided for causing the conveyor to crawl along a surface or up and down steps, these belts being mounted on the pulleys 23 and 22, so as to be driven by the pulleys 23, when the motor 9, which is a reversible motor, is driven in either direction.

For the purpose of adjusting the tension of the belts 7, the plates 1a, as shown in FIGS. 2, 3, 4 and 6, are provided with arcuate slots, the center of curvature of these slots being the pivot bolts 3. The brackets 25 have threadedly secured therein bolts 26 which extend through the aforesaid arcuate slots. When it is desired to adjust the tension of the belts 7, the bolts 26 are loosened, after which the brackets 25 may be swung in either direction to adjust the tension of the belts, and thereafter the bolts 26 may be tightened to maintain the brackets 25 in adjusted position.

The device is also provided with wheels 18, which enable the device to be used as a wheeled truck, and with a caster wheel 35, which, in conjunction with the wheels 18, enable the device to be used as a dolly. These different uses will be presently described.

The wheels 18, as shown in FIGS. 1, 2, 7 and 9, are mounted on axles 17a, which extend laterally outwardly from the horizontal portions 17e of brackets which are pivotally secured to the frame members 1h by means of shoulder bolts 16. These brackets are provided with vertical arms 17.

Secured to the arms 17 of these brackets, as by means of rivets 17d, are lock springs 17c, which are provided at their upper ends with lock pins 17b having reduced ends which extend through openings in the arms 17 and are adapted to extend into openings in the frame members 1.

In FIGS. 1, 2, 7 and 9, the wheels 18 are shown in their operative position, in which position they are maintained by reason of the fact that the springs 17 urge the pins 17b into the openings in the frame members 1, as described above. This lowered position of the wheels 18 is limited by the engagement of the forward ends of the parts 17e of the brackets 17 with the brackets 1e. The brackets 1e also serve to prevent the parts 17e of the brackets 17 from spreading outwardly away from the frame of the device.

With the wheels 18 in the position shown, the device may be used as a wheeled truck, in which case, the device may be tilted to any desired inclined position, and the handles 1m used to guide or manipulate the wheeled truck.

When the device is thus to be used as a wheeled truck, the entire lower frame assembly shown in FIG. 11, along with all of the parts supported thereby, may be removed from the upper frame assembly, as by removing the bolts 2, thereby lightening the device to a point where it may be easily manipulated as a wheeled truck.

When the device is to be used as a conveyor for crawler movement up and down steps, the wheels 18 may be lifted to an inoperative position. This is accomplished by withdrawing the pins 17b from the openings in the frame members 1, and then swinging the brackets 17e–17 in a clockwise direction, as seen in FIG. 7, to a point at which the wheels 18 are inoperative.

For the purpose of enabling the device to be used as a dolly, a caster wheel 35 is provided. This wheel, as best shown in FIGS. 1, 2 and 10, is mounted on a caster mounting assembly 4, which consists of a plate 4a, a clamp 4c, which is bolted to the plate 4a by bolts 4b, a lock spring 4d and a lock pin 4e.

In the operative position shown in FIGS. 1, 2 and 10, the wheel 35 is locked in this position by entry of the pin 4e in an opening provided for this pin in the frame member 6.

When the wheel 35 is not in use, the pin 4e is withdrawn from its opening in the frame member 6, after which, the entire caster mounting assembly may be swung in a clockwise or counterclockwise direction about the member 6 to bring the wheel 35 to an inoperative position, the mounting assembly being held in inoperative position by frictional engagement of the clamp 4c with the frame member 6.

The device is also provided with a toe plate 20, which, when locked in position, acts as a stop for an article which is being transported by the device, especially when the device is in an inclined position.

The toe plate 20 is provided with tubular extensions at its ends which fit telescopically into the forward ends of the members 1 of the upper frame assembly, and which are locked in position by means of pins 19 which extend through the members 1 and into openings provided therefor in the aforesaid tubular extensions.

It is thus seen that I have provided a device which can be used as a power driven crawler type conveyor, as a hand-propelled wheeled truck, or as a dolly, and that these different functions can be attained with a minimum of effort, by simply removing or adjusting certain parts of the device.

When the device is used as a power driven crawler type conveyor, the use of a differential in the drive mechanism enables the device to turn corners without loss of tractive effort and without imposing a strain on the driven parts.

The mounting of the wheels 18 and 35 is novel and advantageous, as is the specific means shown for adjusting the tension of the belts 7.

The provision of the boards 27 on the lower frame assembly is important, in that these boards enable the lower runs of the belts 7 to lie flat and exert a maximum traction along the floor, or up and down steps.

It is to be understood that the form of my invention, herewith shown and described, it is to be taken as a preferred example of the same, and that various changes may be made in the shape, size and arrangement of parts thereof, without departing from the spirit of the invention or the scope of the subjoined claims.

Having thus described my invention, I claim:

1. In a conveyor of the type described, an upper frame assembly comprising a pair of transversely-spaced tubular members, a pair of similarly spaced tubular members disposed below said first-named members and having upwardly curved end portions which are welded at their upper ends to the lower surfaces of said first-named members, and tubular members extending transversely between said first-named members and having their ends welded to the inboard surfaces of said first-named members, and a lower frame assembly comprising a plurality of transversely-spaced tubular members and a plurality of longitudinally-spaced tubular members interconnecting the transversely spaced members, said transversely-spaced tubular members of said lower frame assembly being substantially parallel with said transversely-spaced tubular members of said upper frame assembly and being disposed in substantially a common horizontal plane with those portions of said second-named spaced tubular members of said upper frame assembly which extend between the upwardly curved end portions thereof, means for removably securing said lower frame assembly to said upper frame assembly, said means comprising threaded bushings in the ends of said longitudinally-spaced tubular members of the lower frame assembly, and bolts extending through the second-named tubular members of the upper frame assembly and into threaded engagement with said bushings, a motor supported by said lower frame assembly, a pair of spaced wheels mounted adjacent the front end of said upper frame assembly and driven by said motor, plates mounted adjacent the rear end of the upper frame assembly, brackets disposed adjacent said plates in planes parallel with the planes of said plates, a shaft mounted in said brackets, idler wheels supported on said shaft, and belts driven by said driven wheels, said belts running over said idler wheels and under said lower frame assembly, said brackets being mounted for pivotal movement relatively to said plates, whereby to adjust the tension of said belts.

2. A conveyor, as defined in claim 1, in which said plates have arcuate slots therein, the center of curvature of which is the axis of pivotal movement of said brackets, and bolts are provided which are threadedly secured in said brackets and extend through said arcuate slots, said bolts adapted to be loosened to permit said brackets to be swung in either direction to adjust the tension of the belts, and to thereafter be tightened to maintain the brackets in adjusted position.

References Cited in the file of this patent

UNITED STATES PATENTS

| | | |
|---|---|---|
| 840,663 | Schuneman | Jan. 8, 1907 |
| 1,150,964 | Phelps | Aug. 24, 1915 |
| 1,259,403 | Hunt | Mar. 12, 1918 |
| 1,442,590 | Wyche | Jan. 16, 1923 |
| 2,484,754 | Silva | Oct. 11, 1949 |
| 2,595,453 | Gilmore | May 6, 1952 |
| 2,687,332 | Tilley | Aug. 24, 1954 |
| 2,715,030 | Peterson | Aug. 9, 1955 |
| 2,763,489 | Marsalis | Sept. 18, 1956 |
| 2,770,310 | Gates | Nov. 13, 1956 |
| 2,856,015 | Stefan | Oct. 14, 1958 |
| 2,981,552 | Rutigliano | Apr. 25, 1961 |
| 2,996,133 | LaWarre | Aug. 15, 1961 |

FOREIGN PATENTS

| | | |
|---|---|---|
| 1,112,556 | France | Nov. 16, 1955 |
| 1,170,323 | France | Sept. 22, 1958 |